Aug. 29, 1967 R. D. FORESTER ET AL 3,339,175

IDENTIFICATION NUMBERING FOR SEISMIC TAPE RECORDINGS

Filed Aug. 24, 1965 4 Sheets-Sheet 1

| Decimal Number | Binary Trace 1 | Trace 2 | Trace 3 | Trace 4 |
|---|---|---|---|---|
| 0 | Off | Off | Off | Off |
| 1 | Off | Off | Off | On |
| 2 | Off | Off | On | Off |
| 3 | Off | Off | On | On |
| 4 | Off | On | Off | Off |
| 5 | Off | On | Off | On |
| 6 | Off | On | On | Off |
| 7 | Off | On | On | On |
| 8 | On | Off | Off | Off |
| 9 | On | Off | Off | On |

INVENTORS
Robert D. Forester
Josephus O. Parr, Jr.

BY

ATTORNEYS

IDENTIFICATION NUMBERING FOR SEISMIC TAPE RECORDINGS

Filed Aug. 24, 1965 4 Sheets-Sheet 2

INVENTORS

Robert D. Forester

BY Josephus O. Parr, Jr.,

ATTORNEYS

IDENTIFICATION NUMBERING FOR SEISMIC TAPE RECORDINGS

Filed Aug. 24, 1965 4 Sheets-Sheet 3

INVENTORS
Robert D. Forester
Josephus O. Parr, Jr.,
BY
ATTORNEYS

INVENTORS
Robert D. Forester
Josephus O. Parr, Jr.,
BY
ATTORNEYS 3,339,175
Patented Aug. 29, 1967

1

3,339,175

IDENTIFICATION NUMBERING FOR SEISMIC TAPE RECORDINGS

Robert D. Forester and Josephus O. Parr, Jr., San Antonio, Tex., assignors to Olive Scott Petty, San Antonio, Tex.

Filed Aug. 24, 1965, Ser. No. 482,159
8 Claims. (Cl. 340—15.5)

ABSTRACT OF THE DISCLOSURE

Methods of and apparatus for preparing analog seismic tapes in such form that they may be identified and processed by automatic equipment are disclosed. Thus, digital timing and identification markers are inserted at the beginning of seismic records in appropriate spaced and timed relationship and in some cases are distributed through various tracks to provide binary coded tape identification indicia.

This invention relates to seismic prospecting and more particularly to methods and apparatus for recording and reproducing seismic waves. The invention is especially concerned with improvements in the identification numbering of individual analog seismic recordings made in the field on magnetic tape for subsequent processing in a digital computer.

In seismic prospecting for valuable mineral deposits it is the long-established practice to set up on the surface of the earth a number of seismic detectors at spaced intervals, and to impact the earth, either with explosives or by mechanical means, so as to cause seismic waves to be propagated into the earth. Recordings are then made of those seismic waves which travel by various refraction and reflection paths from the source to the detectors where they are transduced into electrical signals. The recordings may be made in the form of oscillographic tracings on photographic paper so as to provide waveforms which are immediately usable but which cannot be reproduced readily and modified subsequently for optimum results. More generally, the seismic waves are recorded on magnetic tape or other media from which they can be reproduced and processed in various ways on either analog or digital equipment.

In routine prospecting it is not unusual to make several dozen such recordings of seismic waves during the course of one day's work on land. In marine prospecting, where operations are facilitated by the ease of transportation, several hundred recordings may be made each day. Obviously some provision is required for properly identifying the many recordings which accumulate.

For conventional oscillographic recordings, the procedure for many years has been for the equipment operator to write the necessary information on the back of the recording. Later, the essential data is transferred to the printed information block on the front or face of the recording. In some instances purely sequential numbering of the recordings has been accomplished by a printing or photographic counter which is commonly provided on oscillographic cameras. Although somewhat slow, this manual identification numbering has been satisfactory in operations where the data is not subsequently processed by automatic or semi-automatic equipment.

For some years now the recording of seismic data on magnetic tape also has been a standard practice. Such recordings usually have been made in analog form in the field and analyzed later in central data-processing centers so as to produce corrected data which is finally assembled into display sections showing the sub-surface of the earth as a function of depth and horizontal position. For such analog field recordings, the identification number

2 for each seismic tape, which is from three to twelve inches wide and several feet long, has been printed as a visible number of six or seven digits on the unused end or side of the recordings. Such numbers are pre-printed at the time of manufacture; and when the tape is used for recording, the necessary related information is written on the protective dust jacket of the tape or in a separate report book, using the printed serial number as a reference. Any related data required in the data-processing operation is then extracted by the operating personnel from the dust jacket or report sheet listings.

While past processing of seismic field recordings has involved much manual preparation, the introduction of more nearly automatic equipment has been increasing recently. In particular the use of digital computers has made possible approaches previously not possible. In some instances the seismic waves are recorded in digital manner in the field so as to be directly applicable as input to the digital computer. More usually, however, the field recordings have been made in analog form and digitized by the use of a converter at the central processing office. Thus, there exist vast numbers of analog type seismic tape recordings which must be converted whenever digital processing or review is required.

Where a computer is used, it must be triggered at the proper time for analysis of the seismic records. Conventionally this is done at the time break by using the recorded pulse which is generated at the time at which the seismic shot is fired for a computer enabling pulse. However, other initial signals or noises may accumulate and cause the computer to trigger at the wrong zero time, and conventional time breaks can be erroneously recorded to cause the computer to start processing at the wrong time. Such sources of noise can be generated by the analog heads coming into contact with the tape (so-called head rise) and from tape imperfections. The heads on seismic drums sometimes enter a depression at the end of the tapes and then rise with the curvature of the tape and eventually settle down to the tape on the drum cylinder, hence providing the term head rise. Furthermore, nonuniformity in time breaks can occur by radio interference if they are picked up over radio links or by poor timing of the shot itself, since variations of time occur between applying current to the cap and the actual shot where poor contact resistance is encountered in leads.

Also, if a computer processes an analog tape in wrong sequence, the results would be distorted without any apparent cause being indicated. Conventional processing of identification numbers in the field by manual processing into the computer is not only time consuming and costly but in addition leaves considerable chance for error.

It is very desirable that the identification of recording serial numbers and related parameters be made available directly on the tape as electrical input signals to be processed automatically by the digital computer. As will be described later, from such identification numbers in electrical form it is possible to provide comparison and cross-checks, with previously programmed information in the computer, and to use certain of the numbering data as control signals for the processing of groups of recordings, so as to virtually eliminate errors due to use of wrong recordings and provide greater overall efficiency in data handling.

Accordingly, it is a principal object of this invention to provide an improved method and means of providing identification numbers, in magnetic or electrical form, for seismic recordings made on magnetic tape.

Another object is to provide identification numbers which are related physically, in a known definite manner, to other auxiliary signals on the recording such as a system enabling pulse or a seismic time break marking the instant of energy release at a shot or impact point.

Still another object is to provide an electrically reproducible identification numbering arrangement which provides for cross-checks and control of subsequent data processing procedures by means of coding.

Another object is to provide a numbering system which in combination with an enabling pulse permits the computer to reference its timing relative to the time break.

The foregoing and other objects are accomplished by use of an identification numbering method utilizing the binary system in which each character or number is represented simply by the "on" or "off" condition of one or more electrical circuits, or the presence or absence of electrical signal or tape magnetization. Each binary position, using the "binary coded decimal" system, utilizes a separate track or trace on the recording tape. For example, if four separate magnetic traces are available, any decimal number from 0 to 15 can be represented in binary form. If, however, these four traces are to represent one position decimally, then representation is restricted to numbers from 0 through 9. Obviously a large quantity of identification data may thus be recorded if the usual twenty-four to fifty traces of a seismic magnetic recorder are available.

Since only an "on-off" signal indication is required during the numbering period on each trace, it is possible to record directly over such noise and weaker signals as may be present on the record before desired seismic energy is received. Accordingly, the means required to write in binary form on the multiple traces is relatively simple, consisting only of a direct current pulse for "direct" recordings and a source of high frequency carrier current for frequency modulated recordings. Provision is made also for providing the desired time relationship with respect to the time break impulse, so as to impress an enabling pulse which is required to establish computer timing. The overall result of such identification numbering in the form of electrical signals is a clearly identifiable record which may be processed rapidly and without error in a standard digital computer.

Further objects and a more complete understanding of the invention may be had from the following specification and appended drawings, in which.

Figures 1, 5, 6, 6A:
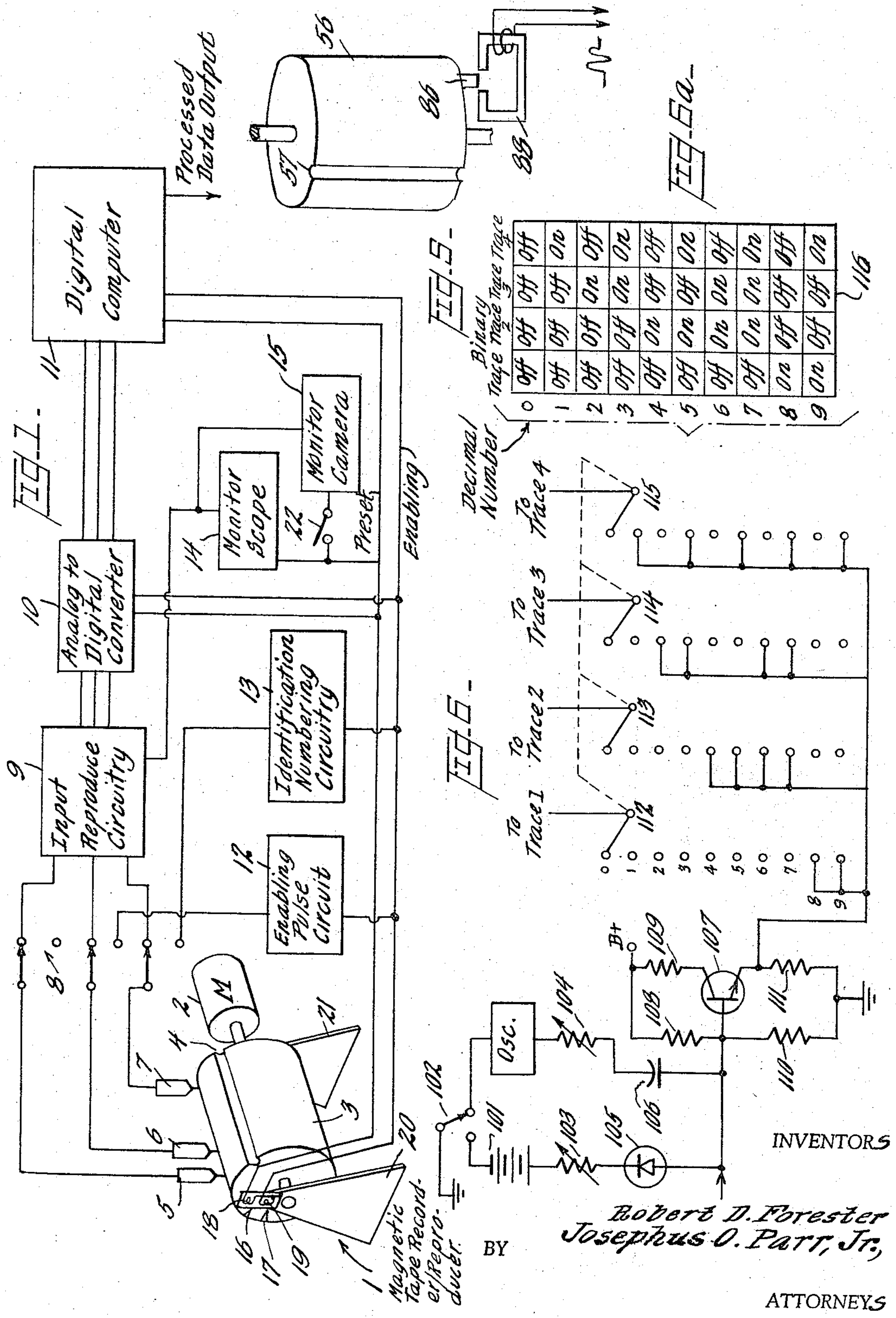
FIGURE 1 is a schematic illustration in block diagram form of the identification numbering apparatus of the present invention.
FIGURE 5 is a detail illustration of one means of providing the enabling pulse.
FIGURE 6 is a schematic illustration of circuitry for establishing a binary signal on four separate traces representing one position of the decimal system.
Figure 7:
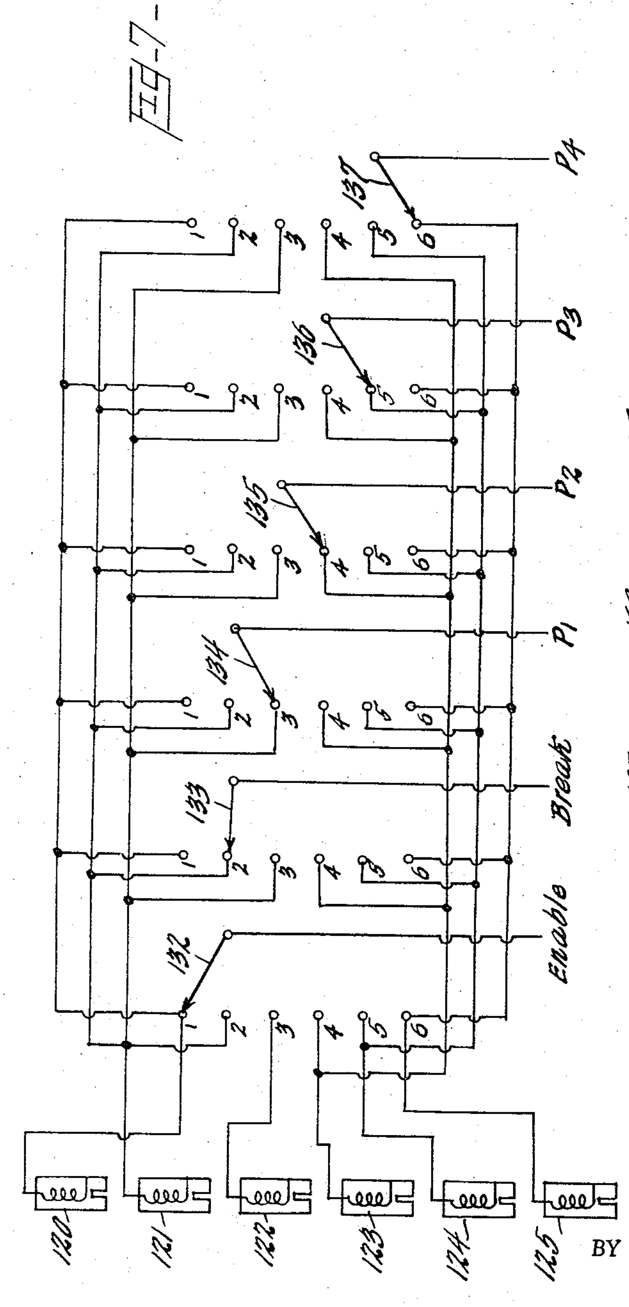
Figure 8:
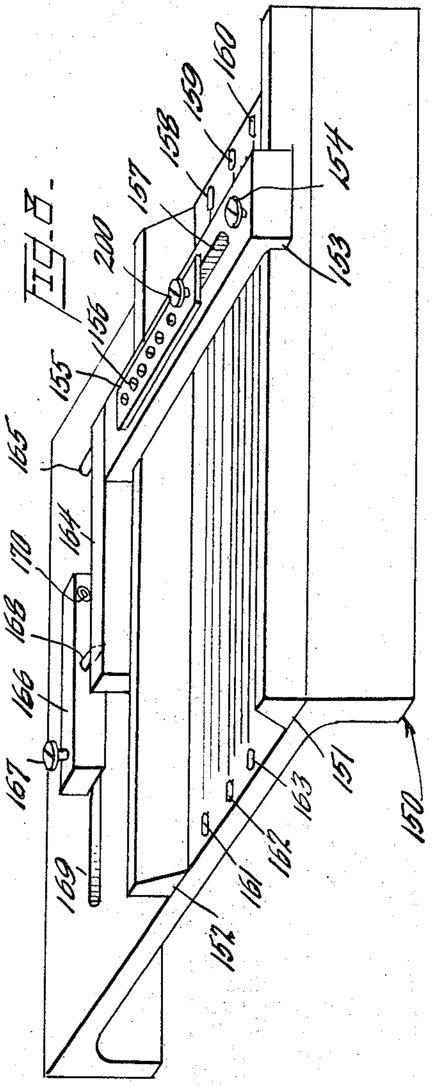
Figure 9:
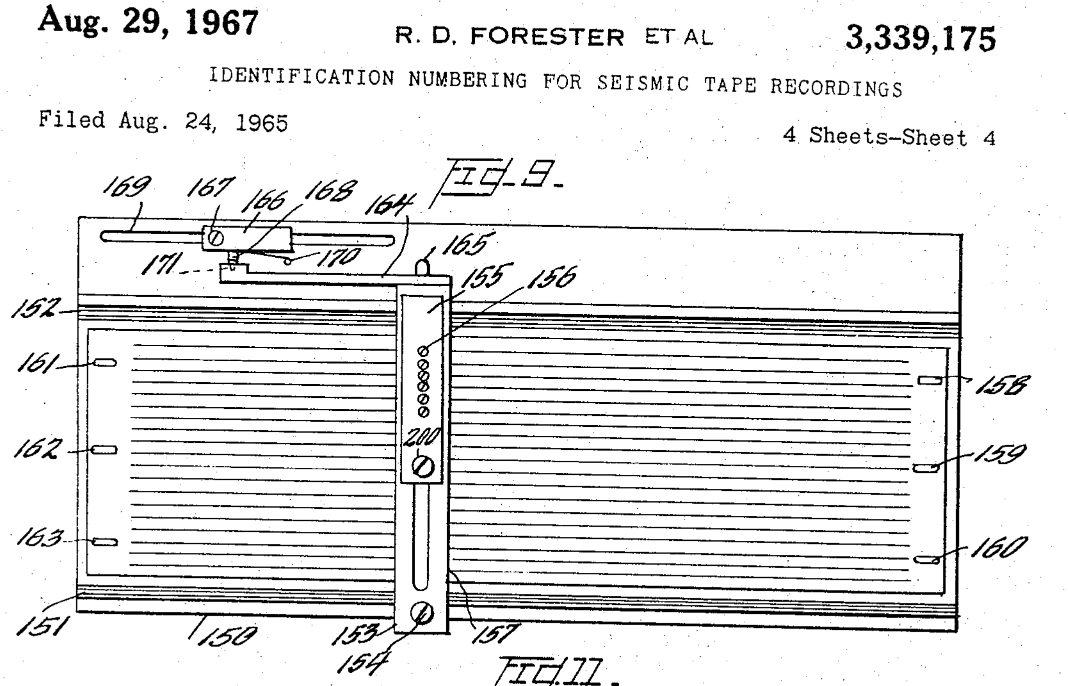
Figures 10, 11, 12, 13:
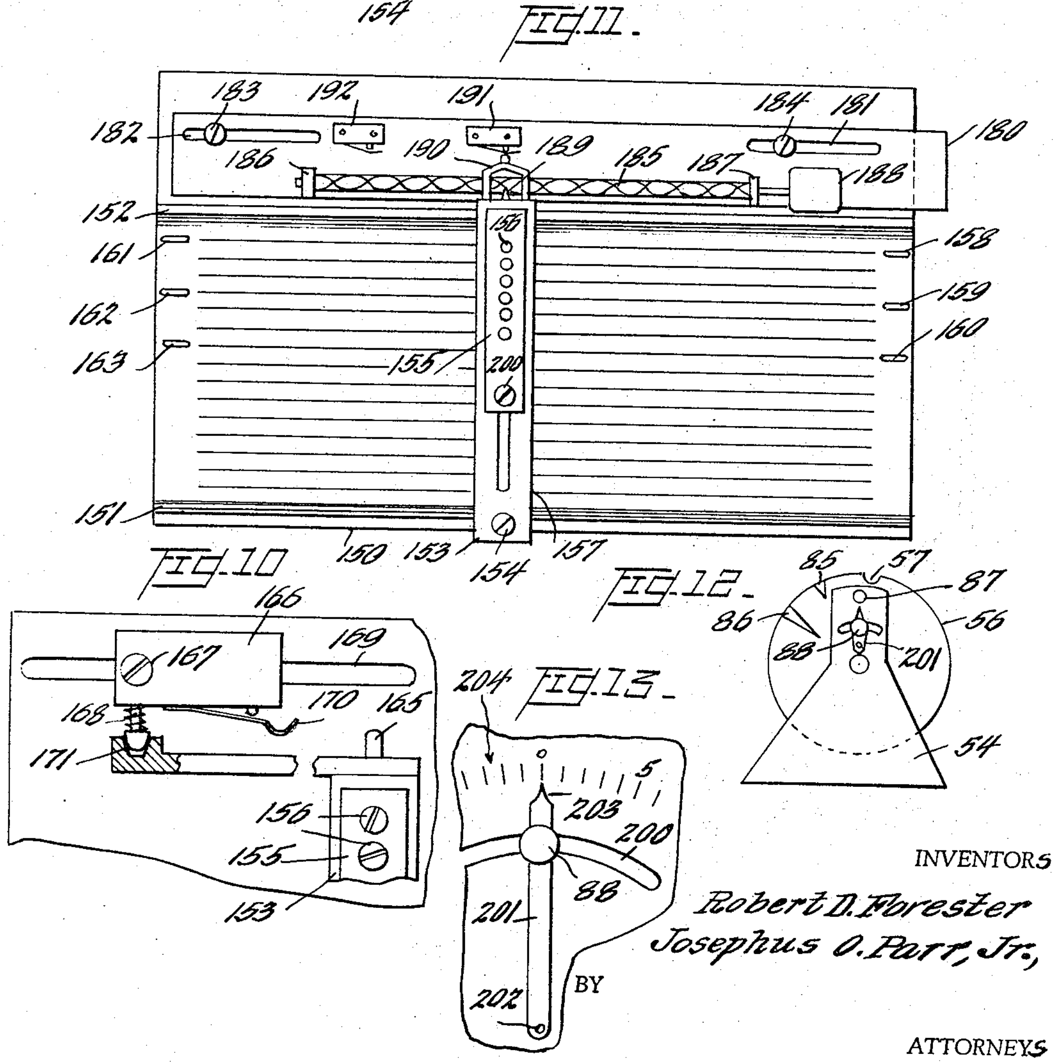

FIGURE 6*a* is a binary to decimal conversion table usable in the illustrated embodiment of the invention;

FIGURE 7 is a schematic illustration of one switching means to provide for placement of the enabling pulse and numbering signals on various traces of a multi-trace magnetic recordings;

FIGURE 8 is a schematic view of an apparatus for numbering a direct magnetic recording by manual means in a flat-bed layout;

FIGURE 9 is a schematic view of the apparatus shown in FIGURE 8, as seen from above;

FIGURE 10 is a detailed view of a portion of FIGURE 9, showing the arrangement for initiating the numbering signals and enabling pulse;

FIGURE 11 is a schematic view, from above, of apparatus for numbering, by manual means, a frequency modulated magnetic recording;

FIGURE 12 is a schematic showing an arrangement for varying the position of enabling and number pulse; and FIGURE 13 is a detailed portion of FIGURE 12.

Referring first to FIGURE 1 of the drawing, there is shown one preferred arrangement for recording identification numbers, on a seismic magnetic recording, and reproducing these numbers for input to a digital computer. Illustrated, in schematic form, are magnetic tape recorder/reproducer 1, record/reproduce switch 8, input reproduce circuitry 9, analog-to-digital converter 10, digital computer 11, enabling pulse circuit 12, identification numbering circuitry 13, monitor oscilloscope 14, monitor camera 15 and camera switch 22. Also illustrated are motor 2, recording tape drum 3, recording gap 4, magnetic heads 5, 6 and 7, preset trigger tooth 16, enabling trigger tooth 17, preset trigger coil 18, enabling trigger coil 19 and mounting frames 20 and 21.

The digital computer may be any sort of conventional data processor which will identify, compare and sequence numbers, process seismic data to reference timing between pertinent events, and effect correlation and corrections to seismic data. For example, the computer should be able to take identification numbers from the seismic tapes and assure that such tapes are handled in proper sequence. Where the identification number contains corrective instructions, such as propagation velocity variations which are peculiar to certain locations, it should detect these and institute appropriate modified data processing routines. It should also be able to reference each trace and corresponding seismic head position with the time break and use the internal timing of such traces to correlate and otherwise process the seismic data for evaluation of pertinent reflections. Since such processing is well known and within the province of many known and available general purpose digital computers and since the computer itself is not a novel feature of the present invention, the computer is shown in the simplified block diagram form. In some cases the computer may be used to print a title corresponding to the serial number of the tape.

Figure 2:
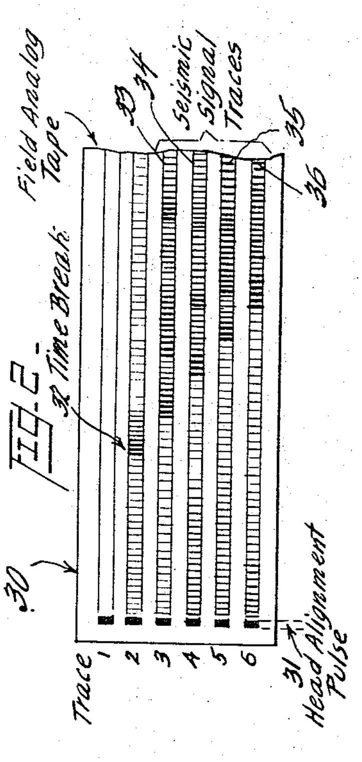
FIGURE 2 is a portion of a multi-trace magnetic field recording of seismic and auxiliary waveforms.

In operation, a field analog tape as illustrated in FIGURE 2, is wrapped around recording tape drum 3 with the leading edge positioned properly with respect to recording gap 4. It will be understood that synchronization means associated with motor 2 will insure that recording gap 4 always lands at the correct position when recording tape drum 3 is at rest. As recording tape drum 3 rotates beneath the magnetic heads 5, 6, 7 data can be either recorded on or reproduced from the field analog tape, depending on the position of record/reproduce switch 8. When record/reproduce switch 8 is in the downward position, the enabling pulse circuit 12 and identification numbering circuitry 13 are connected to magnetic heads 6 and 7, respectively. The use of magnetic head 5 is reserved for reproducing only the timebreak signal, as will be discussed later.

Assume now that recording drum 3 is rotated so as to pass beneath magnetic heads 5, 6 and 7, preset trigger tooth 16 and enabling trigger tooth 17 rotate as part of the drum so as to pass beneath the preset trigger coil 18 and enabling trigger coil 19 respectively. Since these teeth are of magnetized material, an electrical pulse results when they are moved in proximity to the trigger coils. As preset trigger tooth 16 passes preset trigger coil 18, a trigger signal output results; this signal is not used in this stage of the numbering process. Next, the enabling pulse tooth 17 passes enabling trigger coil 19 so as to effect a trigger signal which actuates enabling pulse circuit 12 and identification numbering circuitry 13. As a result, magnetic head 6 is energized so as to record an enabling pulse on its track; also, magnetic head 7 is energized so as to record a binary number, either in the form of "on" or "off" on its track. In practice, as will be described later, the identification numbers actually will occupy a number of tracks and require use of a number of the available magnetic heads. Precautions also are taken to insure that seismic information already recorded is not erased or disturbed.

Next the record/reproduce switch 8 may be placed in the upward position as shown to reproduce signals from the recorder/reproducer 1. The recorded signals will then pass to input reproduce circuitry 9 for amplification and modification. As recording drum 3 rotates, in the reproduce position, the preset pulse output from coil 18 serves to initiate turn-on of circuitry in analog-to-digital converter 10 and digital computer 11, and to start the sweep of monitor scope 14. As drum 3 continues to rotate, the enabling pulse output from coil 19 is applied to *a/d* converter 10 and digital computer 11 to initiate timing functions. Next seismic data is reproduced in electrical form via magnetic heads 5, 6 and 7, passes through the input reproduce circuitry 9, *a/d* converter 10 and appears in digitized form at digital computer 11. This seismic wave information also is displayed on monitor scope 14, along with the enabling pulse, for observation by the equipment operator. A visual recording of the seismic information may be made at the same time on monitor camera 15 by closing camera switch 22 which is associated also with other camera synchronization circuitry.

Accordingly the enabling pulse, as added prior to the time break at a precisely determined time in accordance with this invention, provides that the computer is not subject to triggering on noise at an erroneous time. This in part is due to the provision of a saturated tape, which overcomes any noise on the tape, and provides a step waveform with a duration of say six milliseconds so that five consecutive millisecond clock pulses may be sampled to indicate a computer coding pulse. This alerts the data processing equipment for receipt of the immediately following time break. Contrast this with the uncertainties produced by relying solely on the convention timing from time breaks of various amplitudes and waveshapes or spikelike in form similar to noise signals at high magnitude.

Figure 3:
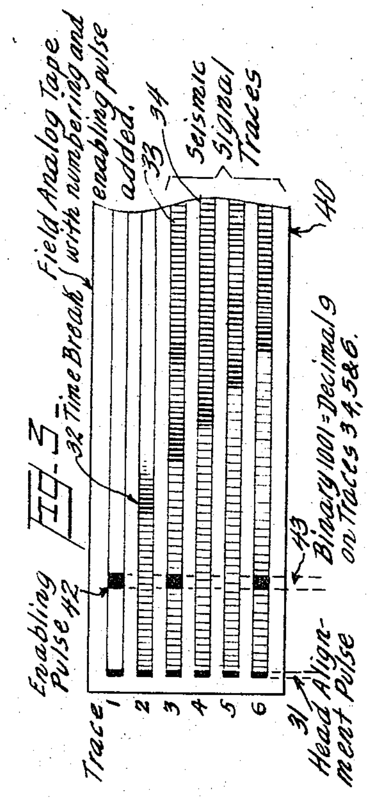
FIGURE 3 is a multi-trace recording of FIGURE 2 with the addition of identification numbering and an enabling pulse.
Figure 4:
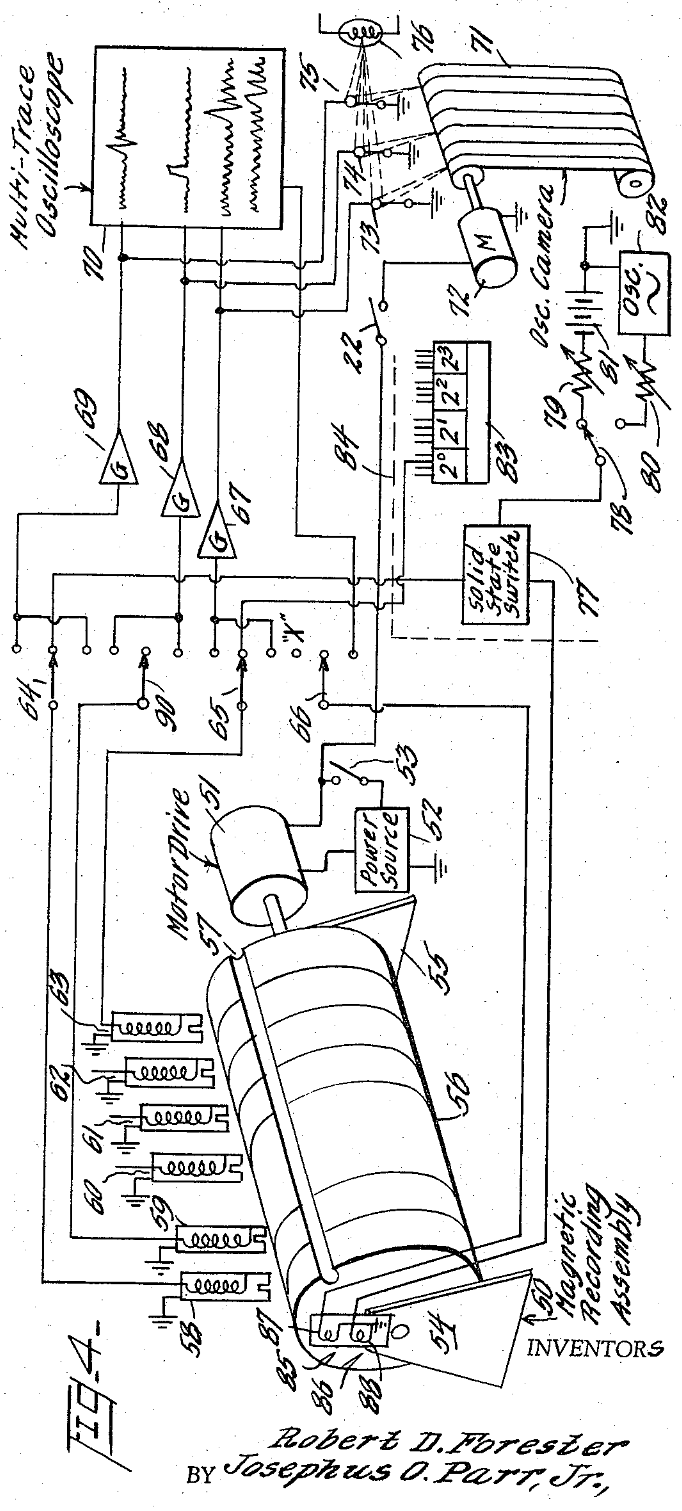
FIGURE 4 is a schematic combined with block diagrams illustrating in greater detail the functioning of the numbering circuitry.

Referring now to FIGURES 2, 3 and 4, operation will be described in greater detail with respect to the steps for numbering a previously recorded seismic magnetic tape. FIGURE 2 illustrates a filed analog recording 30 made on magnetic media in the form of a wide sheet suitable for wrapping around a recording drum. Magnetic data are recorded on six tracks or traces No. 1–6. Uppermost trace No. 1 is left clean of signal for subsequent use; the time break, or instant of energy release, is recorded as waveform 32 on the No. 2 trace; and the remaining four traces No. 3–6 are used in recording seismic wave signals 33, 34, 35 and 36, such as might be received on four geophones located at different sensing positions. In the leading or initial section of field analog tape 30 there is recorded a head alignment pulse 31 on all six traces; this alignment pulse provides for a constant check on the recording equipment to insure that the signals are laid down in the proper time relationship.

Passing now to FIGURE 4, the field analog tape 30 is wrapped around and secured to recording tape drum 56 in such position that the leading, or initial, section and trailing end are in recording gap 57, which normally contains a spring retaining means which are not shown. Three revolutions of recording drum 56, along with suitable positioning of record/reproduce switches 64, 65, 66 and 90, are required to: (1) check the original recording; (2) accomplish the identification number; and (3) check the final modified recording on monitor oscillograph camera 71.

For the first step in the procedure, or the initial revolution of recording drum 56, record/reproduce switches 64, 65, 66 and 90 are placed in the lowest position so that the arm of switch 66 is connected to oscilloscope 70.

In this switch position magnetic heads 58, 59 and 63 will be connected through amplifiers 69, 68 and 67 to multi-trace oscilloscope 70. Motor switch 53 may be closed to actuate motor 51 from power source 52, with associated synchronization provided to cause the recording drum 56 to always stop at the correct position. As the recording drum 56 rotates, the first signal or head alignment pulse 31 is common to all channels. Next in time, as the preset pulse tooth 85 passes preset pulse coil 87, an electrical pulse is generated and conducted to oscilloscope 70 via switch 66 so as to start the sweep. As the recording drum 56 continues to revolve, enabling pulse tooth 86 moves past enabling pulse coil 88 so as to furnish the enabling pulse output which, however, is not utilized during the initial drum revolution. Next, the time break signal appears at magnetic head 59 and finally seismic information signals, at heads 60, 61, 62 and 63, which appear on the traces of oscilloscope 70 via amplifiers 69, 68 and 67. For best results, it will be appreciated that the screen of oscilloscope 70 should have very long persistance. In time sequence, the head alignment pulses 31 should appear quite early, followed by the time break 32 on trace No. 2 and finally seismic waveforms on traces No. 3–6. Trace No. 2 should be free of noise in preparation for the enabling pulse which is to be impressed in the next step. From the overall display on oscilloscope 70, the data-processing operator can ascertain that tape conditions are suitable for the numbering process which follows.

For the second revolution of recording drum 56, record/reproduce switches 64, 65, 66 and 90 are placed in the central position such as shown, so that the arm of switch 66 is connected to no output circuit. Modulation selector switch 78 is positioned so as to select either a direct current from source 81 and control rheostat 79 for "direct" recording, or a high frequency current from oscillator 82 and control rheostat 80 for use with frequency modulated recordings. Motor switch 53 may then be actuated so as to effect the second revolution of recording drum 56. As before, a preset pulse is generated when preset pulse tooth 85 passes preset pulse coil 87; however, this preset pulse is not utilized during this numbering procedure. Next, the enabling pulse will result from enabling pulse tooth 86 passing enabling pulse coil 88. This pulse is applied to solid state switch 77 so as to provide: (1) an enabling pulse current for use in magnetic head 58 to mark the enabling pulse 42 as a magnetization on the tape; and (2) trigger operation of the "binary coded decimal" numbering unit 83 which then impresses, in binary form, a number on trace No. 6 corresponding to magnetic head 63. In practice, of course, binary numbering would be recorded also via the other magnetic heads 60, 61 and 62, with the four recording traces providing for a single decimal position representing numbers 0 through 9 from the separate binary stages $2^0$, $2^1$, etc.

At the conclusion of the second revolution of recording drum 56, the original field analog tape 30 will have been modified, by addition of the enabling pulse 42 and identification number 43, to the form shown in FIGURE 3. The proper numbering of the recording can next be checked by utilizing a third revolution recording drum 56. First, record/reproduce switches 64, 65, 66 and 90 are set in the uppermost position such, for example, that the arm of 66 is connected to the position *x*. Camera switch 22 also is closed. Once again, motor switch 53 is closed so as to effect revolution of recording drum 56 and oscillograph camera 71. As preset pulse tooth 85 passes the preset pulse coil 87, the resulting preset pulse is generated but is not used. During this third revolution the output from enabling pulse coil 88 also is not utilized. As recording drum 56 rotates, recorded enabling pulse 42 is picked off by magnetic head 58 and applied via switch 64 to amplifier 69 and thence to recording galvanometer 75, which in conjunction with light source 76 effects a trace on the photographic medium of camera 71. Next, the originally recorded time break 32 is picked off by magnetic head 59 and applied via switch 90 to amplifier 68 and thence to recording galvanometer 74. From magnetic head 63 there appears first, in time, the single position portion of the binary coded decimal number 43, followed by seismic wave data 36. In the full four trace configuration, similar sequential outputs of numbering pulses and seismic data would be reproduced via magnetic heads 60, 61 and 62. Should the recordings be made using frequency modulation, a frequency demodulator would be included as a portion of amplifiers 67, 68 and 69. In final display the monitor recording made on camera 71 shows the head alignment pulses 31, numbering pulses 43, time break pulse 32 and enabling pulse 42, plus the seismic wave information, all in the correct time relationship shown by the modified filed analog tape 40 in FIGURE 3.

In the arrangement described above, it will be noted that any partial erasure of previously recorded traces is deliberately avoided so as to minimize the possibility of disturbing valuable signal information. In practice the numbering pulses are made of such magnitude as to fully saturate the magnetic tape and effectively override any probable noise or interference. By monitoring the complete recording prior to numbering, the probability of interference at the numbering instant is determined. Nonetheless, in some instances the time relationship between signals and spurious signals and noise may make it desirable to shift the placement of the identification number with respect to the leading edge of the record, the seismic break of the seismic onsets. A suitable arrangement for varying the time delay between the preset pulse and the enabling/numbering pulses is illustrated, in FIGURES 12 and 13, and will be described later.

Referring again to FIGURE 3 showing the modified tape 40, it should be noted that head alignment pulses 31, enabling pulse 42 and numbering pulses 43 are in fixed relationship in time. The head alignment pulse 31 which is recorded on each trace originates in a switch assembly (not shown) operated by the rotation of recording drum 56. Physical placement of this switch assembly with respect to recording gap 57, in which both ends of tape 40 are fastened, is such that head alignment pulse 31 is always recorded shortly after the leading edge of tape 40 passes under magnetic heads 58, 59, 60, 61, 62 and 63. The enabling pulse assembly comprised by tooth 86 and coil 88 also are positioned in fixed relationship to both recording gap 57 and head alignment switch assembly (not shown), so that enabling pulse 42 always is recorded between alignment pulse 31 and time break 32.

Although various means may be used to generate the enabling pulse, the arrangement already described is quite suitable and shown in greater detail in FIGURE 5. Enabling pulse tooth 86 is a section of magnetized material mounted in either the end or edge of drum 56 which is capable of rotation. The associated enabling pulse coil 88 is mounted in fixed for semi-fixed position on the frame on which drum 56 rotates. Coil 88 consists of an inductive winding on a core, of electrical iron or steel, containing an air gap which is in proximitey to drum 56. As the rotation of drum 56 moves enabling pulse tooth 86 close to the gap in the core of coil 88, a voltage is induced in the well-known manner. By proper shaping of tooth 86 and the gap in the magnetic circuit of coil 88, an electrical pulse of both suitable amplitude and duration may be achieved.

Identification numbers and enabling pulses on modified tape 40 are utilized in the following manner in the subsequent digital processing. Using the monitor recordings produced on oscillograph camera 71, the time interval between preset and enabling pulses is used for control operation of digital computer 11 (FIGURE 1).

When modified magnetic tapes 40 are introduced as input to digital computer 11 for processing, internal procedures and circuitry within the computer will compare the tape numbers with the numbers on the program card to see that the proper record is being reproduced. If the tape and program numbers do not correspond, the computer will either reject the particular tape recording or stop until correction is made. Also, the computer 11 will use the time interval between enabling pulse 42 and time break 32, as taken from the tape, to reference its internal timing to the time break. The identification numbering may also contain information as to the location of the prospect and the particular instrument spread which can be used in titling the final data output. Additionally, certain parameters of the particular seismic spread could be included in the numbering so as to introduce corrective variables in the processing of the recording.

The decimal to binary coding conversion for identification numbering may be accomplished with the arrangement shown in FIGURE 6. Numbering switches 112, 113, 114 and 115 are ganged ten position units so wired as to provide output pulses which are recorded in binary form 43 on four traces of a magnetic tape 40 (FIGURE 3). The "on-off" binary to decimal conversion is shown in table 116.

Output from the numbering circuitry is triggered at the correct time instant by the enabling pulse originating from enabling pulse tooth 86 and enabling pulse coil 88 when recording drum 56 is rotated. Transistor 107, with associated circuit components 105, 108, 109, 110 and 111 comprise one type of solid state switch 77 (FIGURE 4). Either direct current, from source 101 via rheostat 103, or high frequency carrier current, from oscillator 100 via rheostat 104, is selectable by operation of modulation switch 102 to effect either "direct" or frequency modulated numbering.

In the quiescent state transistor 107 does not conduct signal. When an enabling pulse is applied to the base of transistor 107, conduction occurs and modulation current flow through numbering switches 112, 113, 114 and 115 to the magnetic heads for traces 1, 2, 3 and 4. The desirable numbering duration of 5 to 50 milliseconds is provided by the characteristics of the enabling pulse, which may be adjusted as indicated previously in connection with FIGURE 5. Alternately, pulse shaping means may be provided in the circuitry connected with transistor 107.

Since six decimal positions are possible when using twenty-four recording traces, as is customary in usual seismic prospecting, it is apparent that a fairly complex and reliable switching means is required. Decimal to binary switches in very compact form, with readily adjustable "thumb wheels," are, however, standard components in the instrument industry. For example, the Digiswitch Model 300, ten position, as manufactured by the Digitran Company, Pasadena, Calif., is quite suitable.

In practice the time break pulse 32 frequently is placed on various traces of recordings made by different prospecting crews. Since the time break trace should not be disturbed by the later recording of additional impulses, it is desirable to provide for selection of the traces on which numbering pulses are to be placed. The switching arrangement shown in FIGURE 7 illustrates a suitable selection means for six traces. Six position switches 132, 133, 134, 135, 136 and 137 are connected to magnetic heads 120, 121, 122, 123, 124, and 125 in such a manner that the time break impulse may be reproduced from any trace, the enabling pulse may be recorded on a suitable quiescent trace, and the remaining traces used in recording a four digit binary number representing 0 to 9 on the decimal scale. In this manner, the numbering may be fitted to any arrangement of traces which usually total 26 to 50 in typical seismic instrumentation.

In the foregoing description, the arrangement of the invention has been accommodated largely to automatic or semi-automatic identification numbering of magnetic tapes on a motor-driven drum transport. While this automatic mode is particularly useful where the usually available tape transports can be shared in time between data-processing and numbering functions, in some instances off-line numbering by more nearly manual means may be preferred. A flat-bed type handling apparatus, shown in FIGURES 8 and 9, provides the essential functions for manual numbering.

On the main bed 150 are rigidly mounted two ways 151 and 152 along which may be moved freely head transport block 153. By use of locking lever or screw 154, transport block 153 may be moved into any horizontal position permitted by ways 151 and 152 and locked in that position. Mounted on transport block 153 is a head plate 155 on which in turn are fastened magnetic recording heads 156 (only one of which is numbered); the entire group of heads 156 may be moved transversely to the ways 151 and 152 in trace selection slot 157 and locked in place by lockscrew 200. Between ways 151 and 152, and beneath the movable head transport block 153, the field analog tape is stretched against bed 150 and held in place by spring mechanism (not shown) which engages the tape slots 158–163. Thus the heads 156 may be moved along the associated magnetic traces on the field analog recording below.

For the present purpose and assuming use of "direct" recording involving no carrier frequency, magnetic heads 156 may be of the flux type which allows a signal to be reproduced even when the heads are not moving with respect to the tape. Hence, with suitable monitoring means connected to heads 156, such as the switching arrangement and oscilloscope shown in FIGURE 4, the operator may manually move the head transport block 153 and thus heads 156 along the tape stretched beneath and note the presence of signals directly on the monitor oscilloscope. Further, the heads 156 may be stopped in motion and held accurately directly above a signal location such as the time break pulse.

On the end of transport block 153, opposite locking lever 154, is located an actuating arm 164 on which are mounted actuator rod 165 and locator indentation 171. Mounted separately on bed 150, and adjacent to the path of actuating arm 164 on transport block 153, is enabling pulse switch assembly 166 which may be moved manually, by means of locking control knob 167, along restraining slot 169 and locked in place. On enabling switch assembly 166 is a spring-loaded locator pin 168 which operates cooperatively with locator indentation 171 on actuating arm 164; also on switch assembly 166 is switch arm 170 which operates cooperatively with actuator rod 165 on actuating arm 164.

Operation of the manual tape numbering apparatus will now be described, it being understood that the simple sliding adjustments might be replaced with more precisely operating rack and pinion drives or the like. The field analog tape 30, illustrated previously in FIGURE 2, is fastened in position in the space provided between ways 151 and 152; record slots 158–163 are engaged by spring mechanism (not shown) so as to pull the magnetic field analog tape down tightly against main bed 150. Usually the field analog tape 30 will contain twenty six or so magnetic traces; tapes of greater width producing up to fifty traces are used on occasion, and provision is made in the adjustments of head plate 155 in trace selection slot 157 to accommodate a variety of tape widths with a smaller number of magnetic heads 156. The transverse position of head plate 155 and heads 156 is adjusted initially to include the trace on which the time break 32 has been recorded.

Next, the operator moves head transport block 153 slowly along the ways 151 and 152, so that heads 156 traverse the associated magnetic traces beneath on tape 30 and effect signals on the monitor oscilloscope 70 (FIGURE 4). As the magnetic head 156 passes the region of time break 32, a corresponding signal or amplitude deflection will occur on the corresponding trace of oscilloscope 70. After precisely locating time break 32 by careful adjustment of head transport block 153, the operator locks the block 153 in fixed position with locking lever 154.

Next, the enabling pulse switch assembly 166 is moved into correct position by loosening control knob 167 and moving assembly 166 along restraining slot 169 until locator pin 168 engages in locator indentation 171 in actuating arm 164 associated with head transport block 153. The enabling pulse assembly 166 is then locked firmly in position by tightening locking control knob 167. It will be noted that locator pin 168, and therefore switch arm 170 on the enabling switch assembly 166, is now spaced precisely a fixed distance from actuator rod 168 which aligned with heads 156 and consequently with the location of time break 32 on the analog tape 30. Thus the enabling pulse 42 will be generated and recorded a precise distance in advance of the time break 32 when the next procedure is accomplished.

Locking lever 154 is now loosened and the head transport block with heads 156 slid toward the initial edge of the tape 30 beneath, or toward record slots 161–163, until actuator rod 165 passes switch arm 170. Next, the record/reproduce switch 64/90/65/66 (as in FIGURE 4) is placed on "record," power is supplied to solid state switch 77 and numbering unit 83, and modulation switch 78 is positioned to pass direct current from source 81. Head transport block 153 with heads 156 is then slid toward the trailing edge of analog tape 30, or toward record slots 158–160; as actuator rod 165 moves switch arm 170, the enabling pulse 42 is generated and recorded on the analog tape record 40. At the same instant numbering pulses 43 are generated via numbering unit 83 and recorded as indicated also on tape 40. In this manual procedure it will be noted that enabling pulse 42 is recorded a precise distance in advance of the time break 32; whereas, in the automatic arrangement described in connection with FIGURE 4, the enabling pulse was placed accurately with respect to the leading edge of the tape or the head alignment pulses 31.

In a variation to provide for adjustment of the distance between time break 32 and enabling pulse 42, the actuator arm 164 could be provided with a number of locator indentations 171, any one of which could be utilized to vary the initial distance between actuator rod 165 and switch arm 170. Similarly actuator rod 165 could be moved to any one of a number of threaded holes at different distance for the position of arm 170, so as to effect adjustment.

The enabling pulse switch assembly 166 and its relation to head transport block 153 are shown in greater detail in FIGURE 10. It will be seen that the locator pin 168 is spring-loaded so as to drop in, or be forced out of, locator indentation 171 easily as actuating arm 164 is moved. It should be noted also that the vertical position of actuator pin 165 is such that it contacts switch arm 170 but clears locator pin 168. Typically, the switch arm 170 would be a part of a switch unit (not shown) such as the Model 1SM1–JS–5 snap-action switch made by Micro Switch Division, Minneapolis Honeywell Corporation, Freeport, Ill.

In the arrangement just described, flux type recording heads are specified so that signals can be reproduced from the magnetic tape even when there is no relative motion between head and tape. Such an arrangement is quite suitable for use with "direct" recorded tapes utilizing AC bias. To reproduce frequency-modulated of FM signals, however, such as are used in some seismic exploration equipment, the head must be moving with respect to the tape.

In FIGURE 11 there is shown an arrangement adapted to manual identification numbering of FM magnetic recordings. The layout in general is similar to that previously described in connection with FIGURE 4, but a power driven reciprocating drive is provided to move head transport block 157 back and forth, at relatively constant velocity, over the tape which is mounted on bed 150 beneath heads 156. Mounted slideably on main bed 150 is a positioning plate 180 on which are arranged, in fixed relationship, a geared motor 188, a drive shaft 185, and bearings 186 and 187. Drive shaft 185 is fitted with double helical grooving which works cooperatively with driving pin 189 mounted on head transport block 157. Thus, when drive shaft 185 is rotated by motor 188 the head transport block 157 with heads 156 is moved reciprocally, through driving pin 189, so as traverse repeatedly the tape recording 30 on bed 150.

Also mounted on positioning plate 180 are reference pulse switch 191 and enabling pulse switch 192 which are so located as to be actuated in sequence by reference actuator pin 190 on head transport block 157. Positioning slots 181 and 182 permit positioning plate 180 with its entire assembly to be moved along main bed 150, and locked finally in place with position locks 183 and 184.

Procedure for manually numbering a previously recorded field analog tape 30, by means of the apparatus of FIGURE 11, now will be described, it being assumed that heads 156 are suitably designed for reproducing frequency-modulated tape signals. Field analog tape 30 is mounted on bed 150 as described previously in connection with FIGURE 9. Heads 156 are connected through circuitry, such as shown in FIGURE 4, to a monitor multi-trace oscilloscope 70 whose sweep is synchronized with the motion of head transport block 157. Amplifiers 67, 68 and 69 are equipped with FM demodulators so as to convert the signals reproduced via heads 159 to amplitude variations.

As head 156 is moved along the trace containing the time break information, the time break pulse 32 will be reproduced and displayed on the screen of oscilloscope 70. Likewise, when reference pulse switch 191 is closed by reference actuator pin 190, a reference pulse will be generated and displayed on oscilloscope 70. The operator now loosens position locks 183 an 184 and moves positioning plate 180 in slots 181 and 182 until the monitored time break and reference pulses are in coincidence on oscilloscope 70. Reference actuator pin 190 now is in physical alignment with the time break pulse on the recording, and positioning plate 180 next is locked in place by tightening position 183 and 184.

It will be noted now that the enabling pulse switch 192 is spaced a known distance from reference pulse switch 191, as viewed from the leading edge of tape 30 or the tape end containing record slots 161–163. The solid state switch 77 and numbering unit 83 are next powered, so that on the next traverse of tape 30 or 40 by heads 156, the enabling pulse 42 and binary coded decimal number 43 are recorded at the instant when reference actuator pin 190 effects closure of enabling pulse switch 192. Numbering unit 83 and solid state switch 77 are then deactivated and the numbered tape 40 may be either checked or removed from the apparatus.

A variation in the mounting arrangement of enabling pulse switch 192 will permit choice of different distances between switch 192 and reference pulse switch 191. If enabling pulse switch 192 is slidably mounted on positioning plate 180, so as to be adjustable or semi-adjustable in position, various distances may be chosen for the recording of enabling pulse 42 in advance of the time break pulse 32.

In connection with the rotating drum arrangement of FIGURE 4, it was mentioned previously that in some instances the presence of seismic signals, or noise, at the usual fixed position for the enabling and numbering pulses may make it desirable to shift the placement with respect to the leading edge of the record. Referring now to FIGURE 12, an arrangement is shown for adjusting the time interval between the preset pulse and the enabling pulse/numbering pulse, it being noted that the preset pulse is in fixed time relationship to the leading edge of the recording.

As before, recording tape drum 56, with recording gap 57, is fitted with a preset pulse tooth 85 which operates in conjunction with preset pulse coil 87 to furnish the preset pulse when drum 56 is rotated. Also mounted on drum 56 is the enabling pulse tooth 86 which originates the enabling pulse as it passes enabling pulse coil 88. In the present modification, however, enabling pulse coil 88 is mounted on adjusting arm 201 which provides effectively for varying the time interval between the preset and enabling pulses. As the enabling pulse coil 88 is moved counterclockwise, the effective time interval is decreased; adjustment in the clockwise direction results in increased time interval.

The adjusting arrangement is shown in somewhat greater detail in FIGURE 13 wherein the adjusting arm 201 is provided with a pivot 202, and the enabling pulse coil 88 moves in adjustment slot 200. In addition, the scale pointer 204 provides a reference for ease in adjusting the time interval. In using the equipment, the operator may view, on the monitor oscilloscope, the portion of the recording which the enabling pulse/numbering pulses would occupy; if this position is noisy or would result in interference with seismic data, adjusting arm 201 may be manipulated so as to relocate the enabling/numbering pulse instant in a more suitable location. Adjusting arm 201 may then be locked in position (by means not shown) and the processing of the recording continued. Referring back to the recording illustration in FIGURE 3, it is thus possible to vary the placement of the enabling pulse 42 and the coincident numbering pulses 43 with respect to the leading edge of the recording or the various signals thereon.

Although the identification numbering method and apparatus have been described in configurations most suitable for use in a central processing office, it is apparent that the objectives of the invention could be accomplished in part by suitable arrangement in field recording equipment. Likewise, for sequential numbering of field records, a part of the numbering could be accomplished automatically by actuating the numbering switches directly from the field recorder drive. Other possible variations will be apparent to those skilled in the art.

What is claimed is:

1. The method of preparing plural track analog seismic tapes for computer processing comprising in combination the steps of:

(1) reproducing in visual form for inspection the data from a field analog recording tape having a time break thereon near the beginning of the record, (2) recording on the tape in a selected position before the occurrence of the time break a group of binary identification pulses distributed through the various tracks, and (3) reading the tape to check the identification pulses.

2. The method of preparing plural track analog seismic magnetic tapes for computer processing comprising the steps of:

(1) recording on the tape on separate tracks a time break signal derived from a seismic impulse, an enabling reference signal of standard characteristics readily identifiable occurring on the tape at a position no later than the time break signal, and (2) further recording an identification number using signals distributed on a plurality of separate tracks.

3. The method of preparing field-recorded plural track analog seismic tapes having time break signals recorded near the end of the tape for computer processing comprising in combination the steps of:

(1) affixing the tape with the end registered at a reference position on a carrier body, (2) providing relatively movable reading means for reproducing the data recorded in the various tracks, (3) producing an enabling signal at a selected position between the time break signals and the end of the tape, and (4) recording a binary signal on selected ones of the tracks responsive to the enabling signal.

4. Apparatus for recording a digital identification number on field recorded plural track analog seismic tapes having a time break on at least one track comprising in combination, a carrier base for holding the tape for reproduction, a series of relatively movable reproducing heads communicating with the recorded channels on the tape when mounted on the carrier base, writing means movable with said heads for recording a signal on the tracks of said tape, scanning means for detecting the position of the time break recorded on the tape, means providing an enabling signal at a selected position on the tape prior to said time break, and means including the writing means for recording a binary number on selected ones of the tape tracks responsive to the timing signal.

5. Apparatus as defined in claim 4 including switching means coupling the timing signal to recording means of selected tracks to thereby designate special arrangements of binary numbers relative to the various tracks.

6. Apparatus as defined in claim 4 including means for metering the enabling signal at a precise distance on the tape prior to the recorded time break.

7. Apparatus as defined in claim 6 including adjustable dial means for selecting the distance between the enabling pulse and the time break.

8. Apparatus as defined in claim 6 including a switch operable to provide a timing signal at a specified distance from the end of the tapes and means responsive to this timing signal to process the signals on the tapes only during a portion of the distance along the tapes.

References Cited

UNITED STATES PATENTS

| | | | |
|---|---|---|---|
| 3,134,957 | 5/1964 | Foote et al. | 340—15.5 |
| 3,187,336 | 6/1965 | Montgomery | 340—15.5 X |
| 3,194,895 | 7/1965 | Treadwell | 179—100.2 |
| 3,231,869 | 1/1966 | Hill et al. | 340—174.1 X |
| 3,283,295 | 11/1966 | Montgomery | 340—15.5 |

BENJAMIN A. BORCHELT, *Primary Examiner.*

SAMUEL FEINBERG, *Examiner.*

R. M. SKOLNIK, *Assistant Examiner.*